US009805037B2

(12) United States Patent
Kurian et al.

(10) Patent No.: US 9,805,037 B2
(45) Date of Patent: Oct. 31, 2017

(54) PAYLOAD INTERROGATION PRIOR TO EXTERNAL DATA CHANNEL SUBMISSION

(71) Applicant: BANK OF AMERICA CORPORATION, Charlotte, NC (US)

(72) Inventors: Manu Jacob Kurian, Dallas, TX (US); Sorin N. Cismas, Addison, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 269 days.

(21) Appl. No.: 14/746,330

(22) Filed: Jun. 22, 2015

(65) Prior Publication Data

US 2016/0373463 A1 Dec. 22, 2016

(51) Int. Cl.
*G06F 21/00* (2013.01)
*G06F 17/30* (2006.01)
*G06F 21/62* (2013.01)
*H04L 29/06* (2006.01)

(52) U.S. Cl.
CPC .... *G06F 17/30067* (2013.01); *G06F 21/6209* (2013.01); *G06F 21/6218* (2013.01); *G06F 21/6272* (2013.01); *H04L 63/123* (2013.01)

(58) Field of Classification Search
CPC ........ G06F 21/60; G06F 21/604; G06F 21/62; G06F 21/6218; G06F 21/6227; G06F 21/6272; G06F 21/64; G06F 21/645
See application file for complete search history.

(56) References Cited

U.S. PATENT DOCUMENTS

| 2005/0127171 A1* | 6/2005 | Ahuja | G06F 21/606 235/382 |
| 2014/0165137 A1* | 6/2014 | Balinsky | G06F 21/554 726/1 |

\* cited by examiner

*Primary Examiner* — Edward Zee
(74) *Attorney, Agent, or Firm* — Michael A. Springs; Moore & Van Allen PLLC; James C. Edwards

(57) ABSTRACT

The present invention relates to verification of the contents of a data file prior to external recipient communication. Specifically, the invention provides for a data file registration repository that registers information associated with data files. In specific embodiments, data registration occurs automatically by capturing the file header metadata. Prior to communicating the file to an external recipient, the payload of the data file is interrogated to determine actual content and the actual content is compared to the registered information to insure that the data being communicated is the same as what the data file is purported to contain (i.e., matches the registered information). Other verifications, such as date type authorization, recipient authorization and the like may also occur in conjunction with the content verification. If the verification(s) is successful, the data is authorized to be placed in the data channel for communication to the external recipient.

19 Claims, 4 Drawing Sheets

PAYLOAD INTERROGATION PRIOR TO EXTERNAL DATA CHANNEL SUBMISSION

FIELD2

In general, embodiments of the invention relate to network data communication and, more particularly, a system for registering a data file and verifying, prior to communicating the data file to an external recipient, that the information associated with the actual data file matches the registered information.

BACKGROUND

In large enterprise businesses, data files are regularly communicated to external entities, such as customers/clients, third-party entities or the like. These data transmissions may involve the transmission of data that confidential or otherwise of a secure nature. As such, the communication of such data typically occurs across a secure data channel, such as FTPS (File Transfer Protocol Secure) or the like. With the proliferation of such communications across a large entity invariably data is communicated that should not have otherwise been communicated. For example, a data file contains data items and/or data elements that should not have been communicated to an external entity. Such inclusion of erroneous data items and/or data elements may occur intentionally or unintentional.

While it is conceivably to provide for interrogation of data once the data is in the data channel, in many instances the data channel will have limited to no visibility to the data files being communicated or may not desire to interrogate the data while in transient due the risk imposed on the communication or the latency resulting.

In addition to the data files containing data items/data elements not intended for inclusion in the data file, other forms of erroneous data transmissions may occur. For example, data may be communicated to external recipients that are not authorized to receive such data (e.g., non-public or confidential information being communicated to an external recipient that is authorized to only receive public (non-secure) information). In addition, data that is classified for internal communication only may be communicated to an external recipient.

Therefore, a need exists to develop systems, apparatus, computer program products, methods and the like that insure that data files being communicated to external recipients actually contain the same data that the data files purport to contain. The desired systems should provide for insuring content validity, as well as, insuring that the data being communicated is correct in type (i.e., data authorized for external communication) and that the external recipient is authorized to receive the type of date being communicated. Moreover, the desired systems and the like should provide for conducting the validity and interrogation checks on the data prior to the data entering the data channel (i.e., between the time that the data files are created and the time when the data files enter the data channel, preferably just prior to the data files entering the data channel).

SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatus, systems, computer program products, methods or the like for verifying data files contain what they purport to contain prior to the data files being communicated to external recipients (i.e., prior to the data files entering a data channel). The present invention relies on data file registration repository that registers information about the data files. In specific embodiments of the invention registering the data files occurs automatically in response to creating and capturing the metadata in the file header of the data file. Prior to communicating the data file to external recipient, the payload of data file is interrogated to determine the actual contents of the data file and the data file registration repository is accessed to identify the registered information associated with data file. The actual contents of the data file is compared to the information stored in the data file registration repository to insure that the data file contains the contents that it is purported to contain (i.e., the contents identified in the registered information). If the comparison results in a match between the actual contents and the registered information, the data file is allowed to enter the data channel and, thus, be communicated to the external recipient. If the comparison results in a difference between the actual contents and the registered information, the data file may be prohibited from being communicated to the external recipient or other actions performed.

In addition to verifying that the data file contains the contents that it purports to contain (i.e., the contents identified in the registered information), the invention may provide for other pre-data channel verifications/checks. Such other verifications/checks may include, but are not limited to, insuring that the type of data being communicated is authorized for external communication, insuring that the external recipient is authorized to receive the type of data being communicated, insuring that the data file has not been modified post-creation/post-registration and the like.

As such embodiments of the present insure that the data intended to be communicated to an external recipient is the actual data communicated to the external recipient. Moreover, embodiments of the present invention may additionally insure that the data is of a type authorized for external communication and that the recipient is authorized to receive the type of data being communicated. In addition, by providing for the verifications/checks prior to data channel entry, the present invention eliminates the risk and latency concerns associated with performing such verifications/checks while the data is in the data channel.

A system for verifying data files prior to communicating the data file, via a data channel, to an external recipient defines first embodiments of the invention. The system includes a computing platform including a memory and at least one processor in communication with the memory. The system further includes a data file registration repository that is stored in the memory and executable by the processor. The repository is configured to register, proximate in time to when a data file is created, information associated with the data file, wherein the registered information includes, at least, contents of the data file. The system further includes a data file interrogation and verification module that is stored in the memory and executable by the processor. The module is configured to receive the data file prior to data channel submission, access the data file registration repository to identify the registered information associated with the data file, interrogate a payload of the data file to determine actual contents of the data file and compare the actual contents to the registered information to determine difference between the actual contents and the registered information.

In specific embodiments of the system the data interrogation and verification module is further configured to determine a type of the difference and, based on the type of the difference, perform one of (1) prohibit the data file from being communicated to the external recipient, (2) request approval for the data file to be communicated to the external identity or (3) communicate the data file to the external identity and alert predetermined internal entities.

In further specific embodiments of the system the data file registration repository is further configured to automatically register the information associated with the data file based on receipt, upon creation of the data file, file header metadata that includes the information to be registered. In such embodiments of the system, the information/metadata includes one or more of filename, file size, file type, checksum, identity of file creator, identity of one or more file revisers, dates of the one or more revisions to the file, quantity of line items, and quantity of secure data elements.

In alternate embodiments of the system the data file registration repository is further configured to register information associated with the data file, wherein the registered information includes the contents of the data file, wherein the contents of the data file includes a line item quantity and a secured data element quantity. In such embodiments of the system, the data file interrogation and verification module is further configured to interrogate a payload of the data file to determine actual line item quantity and actual secured data element quantity and compare the actual line item quantity and actual secured data element quantity to the registered line item quantity and registered secured data element quantity to determine a difference between either one of the actual line item quantity and the registered line item quantity or the actual secured data element quantity and the secured data element quantity.

In further specific embodiments of the system the data file registration repository is further configured to register information associated with the data file, wherein the registered information includes a first checksum resulting from creation of the data file. In such embodiments of the system, the data file interrogation and verification module is further configured to create a second checksum of the received data file and compare the second checksum to the first checksum to determine a difference between the first and second checksums.

In yet further specific embodiments of the system, the data file registration repository is further configured to register the information associated with the data file, wherein the registered information includes identity of the external recipient. In such embodiments of the system, the data file interrogation and verification module is further configured to receive an intended external recipient of the data file, and compare the intended external recipient to the identity of the external recipient in the registered information to determine a difference between the intended external recipient and the identity of the external recipient in the registered information.

In further related embodiments of the system, the data file registration repository is further configured to register the information associated with the data file, wherein the registered information includes a security status of the contents of the data file. In such embodiments the system may further include an external recipient security rating repository that is stored in the memory and executable by the processor. The rating repository is configured to store security ratings for a plurality of external recipients that define a type of data that each external recipient is authorized to receive. In such embodiments, the data file interrogation and verification module is further configured to access the external recipient security rating repository to determine the security rating for the intended external recipient and compare the security rating to the security status of the contents of the data file to determine if the security rating is noncompliant with the security status of the contents of the data file.

In still further embodiments the system includes an alert module stored in the memory, executable by the processor and configured to receive notification from the data file interrogation and verification module that the comparison resulted in a difference between the actual contents and the registered information and generate and initiate communication of an alert, to one or more predetermined internal recipients, that is configured to notify the internal recipients that the data file is prohibited from being communicated to the external recipient.

A method for verifying data files prior to communicating the data file, via a data channel, to an external recipient defines second embodiments of the invention. The method includes registering, in a data file registration repository, proximate in time to when a data file is created, information associated with the data file, wherein the registered information includes, at least, contents of the data file. The method further includes accessing the data file registration repository to identify the registered information associated with the data file. In addition, the method includes interrogating, by a computing device processor, a payload of the data file to determine actual contents of the data file and compare the actual contents to the registered information to determine difference between the actual contents and the registered information, wherein the interrogation occurs prior to the data file entering the data channel.

In specific embodiments the method further includes determining, by a computing device processor, a type of the difference between the actual contents and the registered information and, based on the type of the difference, performing one of (1) prohibit the data file from being communicated to the external recipient, (2) request approval for the data file to be communicated to the external identity or (3) communicate the data file to the external identity and alert predetermined internal entities.

In further specific embodiments of the method registering information associated with the file further comprises automatically registering the information associated with the data file based on receiving, upon creation of the data file, file header metadata that includes the information to be registered. In such embodiments of the method, the information/metadata includes one or more of filename, file size, file type, checksum, identity of file creator, identity of one or more file revisers, dates/times of the one or more revisions to the file, quantity of line items, and quantity of secure data elements.

In still further specific embodiments of the method registering information associated with the file further comprises registering information associated with the data file, wherein the registered information includes the contents of the data file, wherein the contents of the data file includes a line item quantity and a secured data element quantity. Interrogating the data file further comprises interrogating the payload of the data file to determine actual line item quantity and actual secured data element quantity and compare the actual line item quantity and actual secured data element quantity to the registered line item quantity and registered secured data element quantity to determine a difference between either one of the actual line item quantity and the registered line item quantity or the actual secured data element quantity and the secured data element quantity.

A computer program product including a non-transitory computer-readable medium defines third embodiments of the invention. The computer-readable medium includes a first set of codes for causing a computer to register, in a data file registration repository, proximate in time to when a data file is created, information associated with the data file, wherein the registered information includes, at least, contents of the data file, The computer-readable medium additionally includes a second set of codes for causing a computer to access the data file registration repository to identify the registered information associated with the data file. Moreover, the computer-readable medium includes a third set of codes for causing a computer to interrogate the payload of the data file to determine actual contents of the data file and compare the actual contents to the registered information to determine difference between the actual contents and the registered information, wherein the interrogation occurs prior to the data file entering the data channel.

Thus, systems, apparatus, methods, and computer program products herein described in detail below provide verifying the contents of a data file prior to external recipient communication. The present invention provides for a data file registration repository that registers information associated with data files. In specific embodiments, data registration occurs automatically be capturing the file header metadata. Prior to communicating the file to an external recipient (i.e., prior to placing the data file in a data channel), a payload of the data file is interrogated to determine actual content and the actual content is compared to the registered information to insure that the data being communicated is the same as what the data file is purported to contain (i.e., matches the registered information). Other verifications, such as date type authorization, recipient authorization and the like may also occur in conjunction with the content verification. If the verification(s) is successful, the data is authorized to be placed in the data channel for communication to the external recipient, otherwise others actions may be taken, including prohibiting the data file from being communicated.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
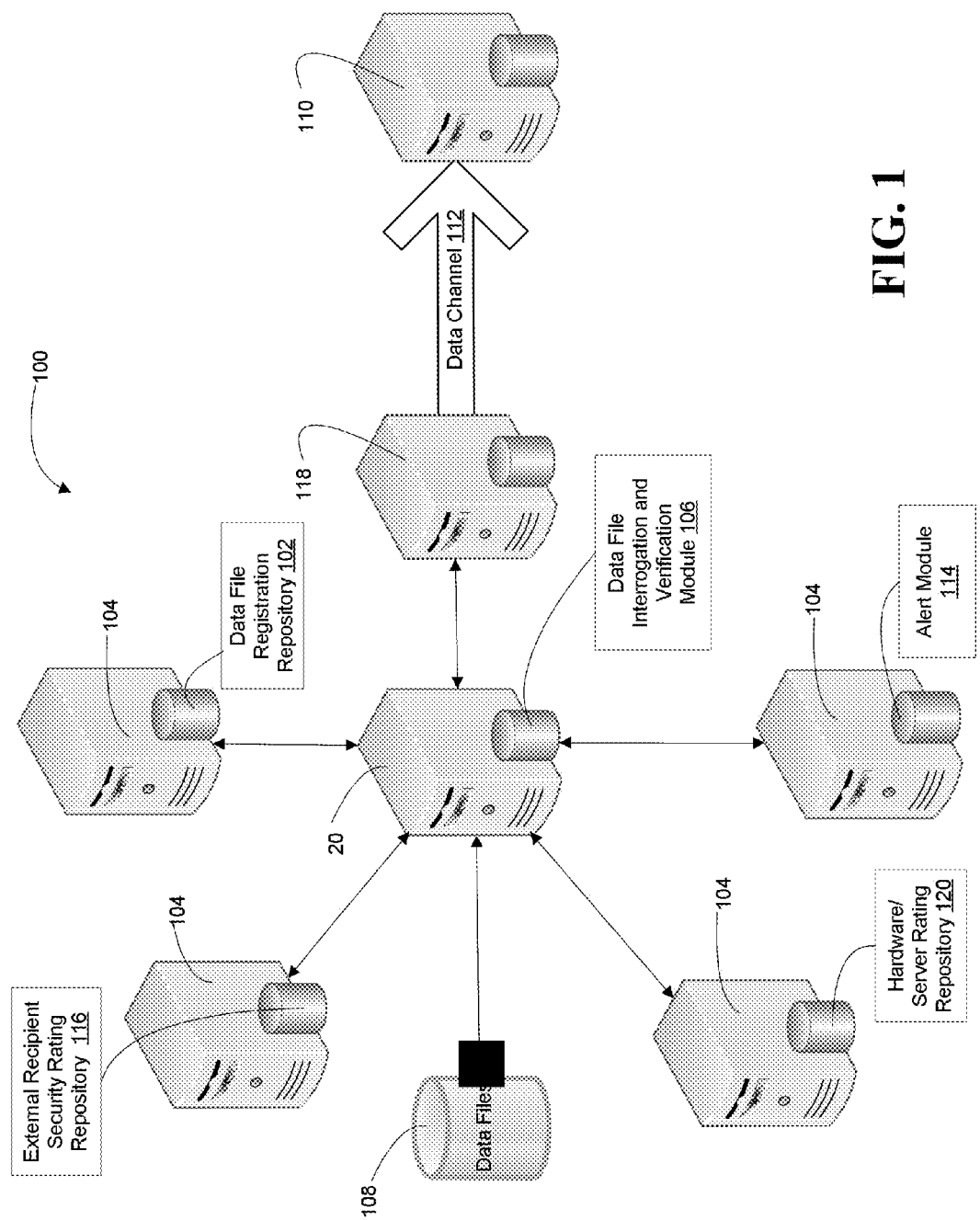
Figure 2:
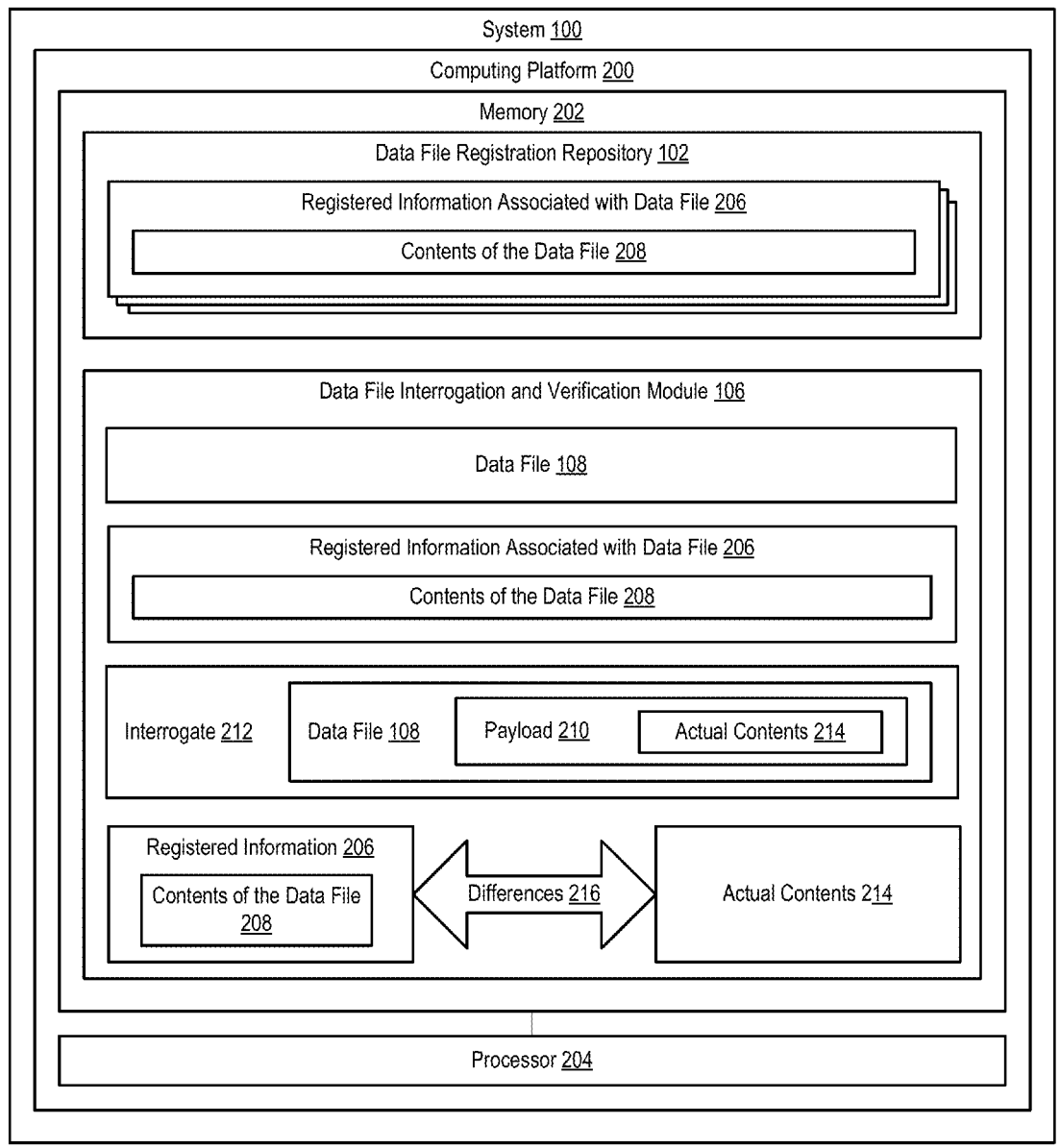
Figure 3:
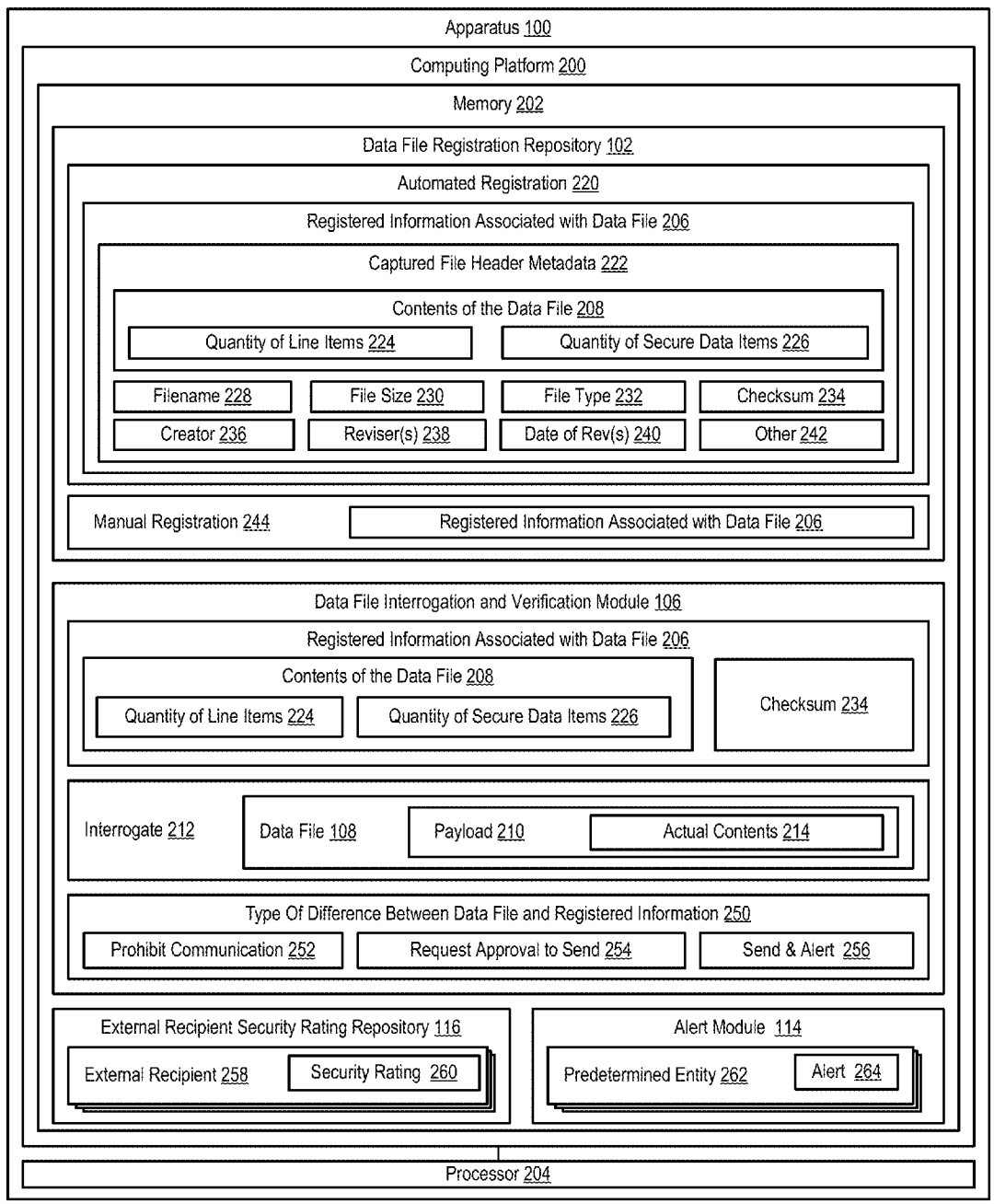
Figure 4:
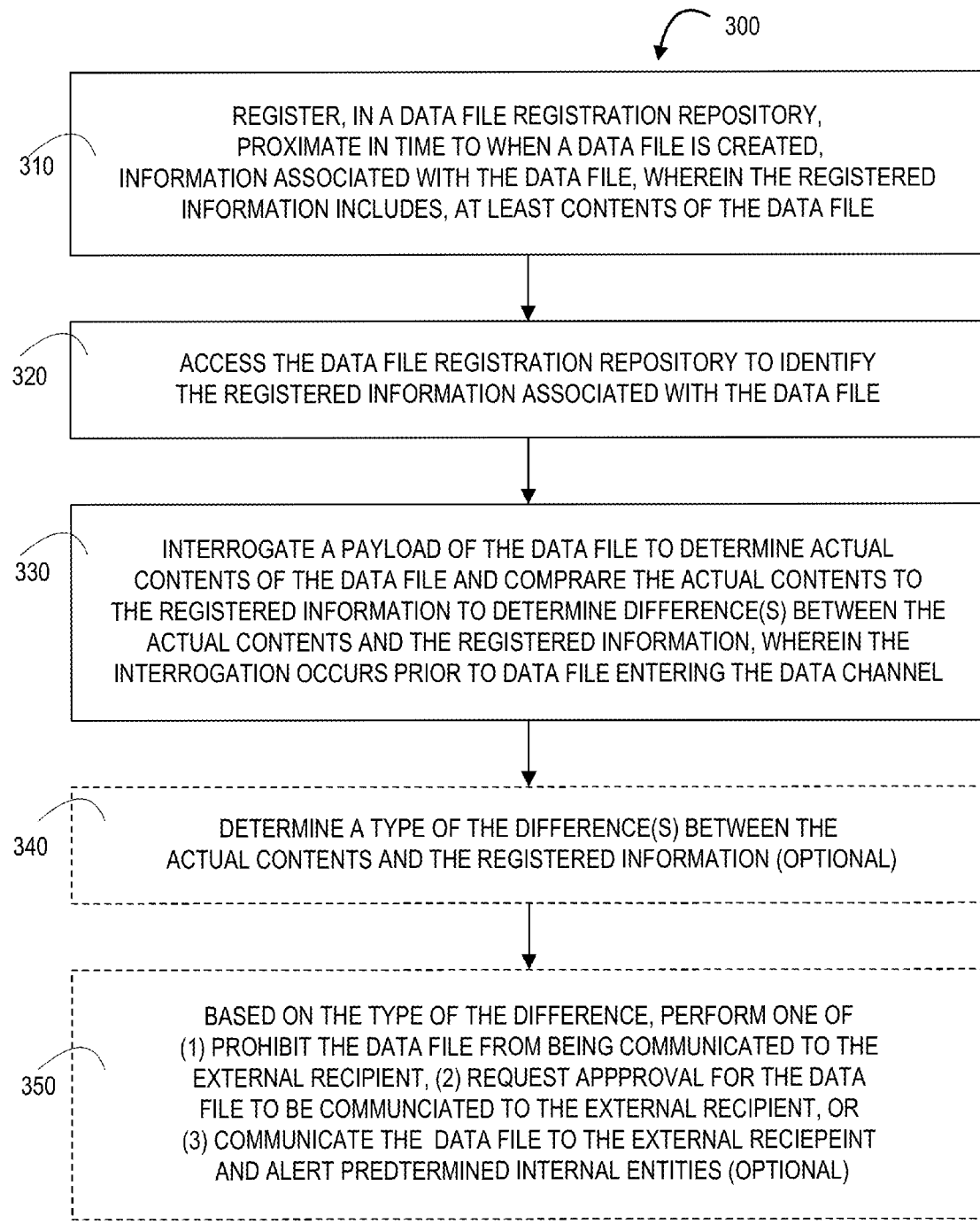

Having thus described embodiments of the invention in general terms, reference will now be made to the accompanying drawings, which are not necessarily drawn to scale, and wherein:

FIG. 1 provides a schematic diagram of a system for verifying the contents of a data file prior to external recipient communication, in accordance with embodiments of the present invention;

FIG. 2 provides a block diagram of a system for verifying the contents of a data file prior to external recipient communication, in accordance with embodiments of the present invention;

FIG. 3 provides a block diagram of a system for verifying contents of a data file and request authorization for communication of the data file to an external recipient, in accordance with embodiments of the present invention; and FIG. 4 provides a flow diagram of a method for verifying the contents of a data file prior to external recipient communication, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Although some embodiments of the invention described herein are generally described as involving a "financial institution," one of ordinary skill in the art will appreciate that the invention may be utilized by other businesses that take the place of or work in conjunction with financial institutions to perform one or more of the processes or steps described herein as being performed by a financial institution.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as Java, Perl, Smalltalk, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

According to embodiments of the invention described herein, various systems, apparatus, methods, and computer program products are herein described for verifying the contents of a data file prior to external recipient communication. The present invention provides for a data file registration repository that registers information associated with data files. In specific embodiments, data registration occurs automatically be capturing the file header metadata. Prior to communicating the file to an external recipient (i.e., prior to placing the data file in a data channel), a payload of the data file is interrogated to determine actual content and the actual content is compared to the registered information to insure that the data being communicated is the same as what the data file is purported to contain (i.e., matches the registered information). If the verification(s) is successful, the data is authorized to be placed in the data channel for communication to the external recipient, otherwise others actions may be taken, including prohibiting the data file from being communicated.

In addition to verifying that the data file contains the contents that it purports to contain (i.e., the contents identified in the registered information), the invention may provide for other pre-data channel verifications/checks. Such other verifications/checks may include, but are not limited to, insuring that the type of data being communicated is authorized for external communication, insuring that the external recipient is authorized to receive the type of data being communicated, insuring that the data file has not been modified post-creation/post-registration and the like.

As such, embodiments of the present insure that the data intended to be communicated to an external recipient is the actual data communicated to the external recipient. Moreover, embodiments of the present invention may additionally insure that the data is of a type authorized for external communication and that the recipient is authorized to receive the type of data being communicated. By providing for the verifications/checks prior to data channel entry, the present invention eliminates the risk and latency concerns associated with performing such verifications/checks while the data is in the data channel.

Referring to FIG. 1, a schematic diagram is provided of a system 100 for providing data file verification prior to data channel submission, in accordance with embodiments of the present invention. The system includes a data file registration repository 102 stored in network server 104 or the like and data file interrogation and verification module 106 stored and executable in network server 104 or the like. The data file registration repository is configured to register information associated with data files 108 that warrant communication to external recipients 110 (e.g., customers of the enterprise/business, third party vendors of the enterprise/business and the like). In specific embodiments of the invention the registration occurs automatically in response to creating the data file 108 by capturing or otherwise receiving metadata stored in the file header of the data file. In other embodiments of the invention, registration may occur manually by inputting requisite information associated with the data file 108. In specific embodiments registration occurs or is required to occur proximate in time to creation of the data file 108, although in alternate embodiments registration may occur at any point in time prior to the time at which the data file 108 is submitted to the data channel 112 for communication to the external recipient. At a minimum, registration includes registering the contents of the data file 108, such as, the quantity of line items and quantity of secure (e.g., non-public information) data elements.

The data interrogation and verification module 106 is configured to receive a data file 108 prior to submission to the data channel 112. It should be noted that interrogation occurring proximate in time to submitting the data file 108 to the data channel is preferred since it insures that the data file 108 is not intentionally or unintentionally altered after verification but prior to communication. Once the data file 108 is received, the payload of the data file interrogated to determine the actual contents of the data file 108. Actual contents may include, but is not limited to, the quantity of line items, the quantity of secure data elements and the like. The data interrogation and verification module 106 is further to access the data file registration repository 102 to retrieve the registered information associated with the data file 108 and compare the actual contents to the registered information. In specific embodiments of the system, if no differences result from the comparison, the data file 108 is permitted to enter the data channel 112 to be communicated to the external recipient 110. In other embodiments of the invention, if differences(s) result from the comparison one or more actions may be performed, such as, but not limited to, prohibiting the data file 108 from being communicated to the external recipient 110, notifying internal entities of the difference(s) and seeking approval to communicate the data file 108 to the external recipient 110, and/or allowing the data file 108 to be communicated to the external recipient 110 with coinciding alerts being sent to internal entities. Thus, in the event that the comparison results in differences, the data interrogation and verification module 102 may be configured to access alert module 114 that stores a list of predetermined internal alert recipients and determines alert recipients based on the type of difference(s) or other factors.

In alternate embodiments of the system, the data interrogation and verification module 106 may perform other verifications besides payload/content verifications, prior to submitting the data file 108 to the data channel 112. For example, the data interrogation and verification module 106 may perform a checksum verification to insure that the data file has not been changed or otherwise tampered with since the registration process. Moreover, the data interrogation and verification module 106 may perform security checks to insure that security level of the data file (e.g., internal communication only, external communication authorized and the like) meets external communication requirements and that the external recipient meets security requirements. Thus, the data interrogation and verification module 106 may access external recipient security rating repository 116 stored in network server 104 or the like to identify the security rating (e.g., public rating—not authorized to receive confidential data, secure-rating—authorized to receive confidential data, and the like) associated with the intended recipient and compare the security rating of the intended external recipient to the actual contents of the data file.

In still further embodiments of the invention, the data interrogation and verification module 106 is configured to perform a hardware/server verification to verify that the server 118 being implemented to communicate the data file 108 meets a requisite server rating/level for the data file 108 being communicated. In such embodiments of the system, the data interrogation and verification module 106 may access hardware/server rating repository 120 stored in network server 104 or the like to identify the security rating (e.g., public rating—not authorized to transmit confidential data, secure-rating—authorized to transmit confidential data, and the like) associated with the network server 118 and compare the security rating of the server 118 to the actual contents of the data file 108. For a more detailed teaching of a server rating system, please refer to U.S. patent application Ser. No. 14/588,430, entitled "System for Authorizing Electronic Communication of Confidential and Proprietary Data to External Entities", filed 1 Jan. 2015 and assigned to the same inventive entity as the current application. The contents of the aforementioned application are incorporated by reference as if set forth fully herein.

Referring to FIG. 2, a block diagram is presented of a system 100 configured for providing data file verification prior to data channel submission, in accordance with an embodiment of the present invention. The system 100 includes a computing platform 200 having a memory 202 and a processor 204 in communication with the memory 202. The memory 202 of computing platform 200 stores data file registration repository 102 that is executable by processor 204 and configured to register information 206 associated with data file 108 that warrant communication to external recipients (e.g., customers of the enterprise/business, third party vendors of the enterprise/business and the like). In specific embodiments of the invention the registration occurs automatically in response to creating the data file 108 by capturing or otherwise receiving metadata stored in the file header of the data file. In other embodiments of the invention, registration may occur manually by inputting requisite information associated with the data file 108. At a minimum, registration includes registering the contents 208 of the data file 108, such as, the quantity of line items and quantity of secure (e.g., non-public information) data elements.

Memory 202 of computing platform 200 also includes data interrogation and verification module 106 that is executable by processor 204 and is configured to receive a data file 108 prior to submission to the data channel (not shown in FIG. 2). Once the data file 108 is received, the payload 210 of the data file 108 is interrogated 212 to determine the actual contents 214 of the data file 108. Actual contents 214 may include, but is not limited to, the quantity of line items, the quantity of secure data elements and the like. The data interrogation and verification module 106 is further to access the data file registration repository 102 to retrieve the registered information 206 associated with the data file 108 and compare the actual contents 214 to the registered information 206, specifically the contents 208 of the data file 108 to determine if differences 216 exist between the actual contents 214 and the contents 208 of the registered information 206.

Referring to FIG. 3 a more detailed block diagram is presented of a system 100, which is configured for providing, in accordance with embodiments of the present invention. In addition to providing greater detail, FIG. 3 highlights various alternate embodiments of the invention. The system 100 may include one or more of any type of computing device, such as a server or the like. The present system and methods can accordingly be performed on any form of one or more computing devices.

The system 100 includes computing platform 200 that can receive and execute algorithms, such as routines, and applications. Computing platform 200 includes memory 202, which may comprise volatile and non-volatile memory, such as read-only and/or random-access memory (RAM and ROM), EPROM, EEPROM, flash cards, or any memory common to computer platforms. Further, memory 202 may include one or more flash memory cells, or may be any secondary or tertiary storage device, such as magnetic media, optical media, tape, or soft or hard disk. Moreover, memory 202 may comprise cloud storage, such as provided by a cloud storage service and/or a cloud connection service.

Further, computing platform 200 also includes processor 204, which may be an application-specific integrated circuit ("ASIC"), or other chipset, processor, logic circuit, or other data processing device. Processor 204 or other processor such as ASIC may execute an application programming interface ("API") (not shown in FIG. 3) that interfaces with any resident programs, such as data file interrogation and verification module 106 and routines, sub-modules associated therewith or the like stored in the memory 202 of system 100.

Processor 204 includes various processing subsystems (not shown in FIG. 3) embodied in hardware, firmware, software, and combinations thereof, that enable the functionality of system 100 and the operability of the apparatus on a network. For example, processing subsystems allow for initiating and maintaining communications and exchanging data with other networked devices, such as network servers 104 (FIG. 1). For the disclosed aspects, processing subsystems of processor 204 may include any subsystem used in conjunction with data file interrogation and verification module 106 and related algorithms, sub-algorithms, modules, sub-modules thereof.

Computer platform 200 may additionally include communications module (not shown in FIG. 3) embodied in hardware, firmware, software, and combinations thereof, that enables communications among the various components of the system 100, as well as between the other networked devices. Thus, communication module may include the requisite hardware, firmware, software and/or combinations thereof for establishing and maintaining a network communication connection.

The memory 204 of system 100 stores data file registration repository 102 that is executable by processor 204 and configured to register information 206 associated with data file 108 that warrant communication to external recipients 258 (e.g., customers of the enterprise/business, third party vendors of the enterprise/business and the like). In specific embodiments of the invention the registration is automated registration 220 that occurs in response in response to creating the data file 108 by capturing or otherwise receiving metadata 22 stored in the file header of the data file. The metadata/file header information may include contents of the data file 208, such as, quantity of line items 224 and/or quantity of secure data items 226 or the like. Additionally, the metadata may include, but is not limited to, filename 228, file size 230, file type, checksum 234, creator ID 236, reviser(s) ID 238, date of creation/revision(s) 240 and any other metadata 242. In other embodiments of the invention, registration is manual registration 244 that may occur manually by inputting requisite registration information 206 associated with the data file 108.

As previously discussed, memory 202 of computing platform 200 also includes data interrogation and verification module 106 that is executable by processor 204 and is configured to receive a data file 108 prior to submission to the data channel (not shown in FIG. 2). Once the data file 108 is received, the payload 210 of the data file 108 is interrogated 212 to determine the actual contents 214 of the data file 108. Actual contents 214 may include, but is not limited to, the quantity of line items, the quantity of secure data elements and the like. The data interrogation and verification module 106 is further to access the data file registration repository 102 to retrieve the registered information 206 associated with the data file 108 and compare the actual contents 214 to the registered information 206, specifically the contents 208 of the data file 108, such as quantity of line items 224 and quantity of secure data items 226 to determine if differences exist between the actual contents 214 and the contents 208 of the registered information 206. Moreover, the data interrogation and verification module 106 may, in some embodiments, be configured to compare the checksum 234 in the registered information 206 and compare the registered checksum 234 with a checksum of the actual data file 108 to insure that the data file 108 has not been modified since the data file was registered.

In specific embodiments of the invention, in response to the data interrogation and verification module 106 is configured to determine the type of the differences (e.g., different quantity of line items, different quantity of secure data items, and the like) and based on the type of difference determine one or more actions to perform. The actions may include, but are not limited to, prohibit the communication 252 of the data file 108 to the external recipient 258, request approval 254 from internal entities/personnel for approval to communicate the data file to the external recipient, communicate 256 the date file to the external recipient and communicate alerts to predetermined internal entities that notify the internal entity that data has been communicated that exhibited differences between registered information and actual data file content 214.

In further specific embodiments the system 100 includes external recipient security rating repository 116 that stores a security rating 260 for each external recipient 258, such that data interrogation and verification module 106 accesses the external recipient security rating repository 116 to determine if the intended external recipient's security rating is consistent or otherwise meets the security level of the data file. Moreover, the system may include hardware/server security rating repository 120 (shown in FIG. 1) that stores a security rating for internal and, in some embodiments, external hardware/servers, such that data interrogation and verification module 106 accesses the hardware/server security rating repository 116 to determine if the security rating or the internal transmitting server and/or the external receiving server is consistent or otherwise meets the security level of the data file.

Additionally, system 100 may include alert module 114 that is stored in memory 202, executable by processor 204 and configured to generate and initiate communication of an alert 264 to one or more predetermined entities 262. The alert 264 may be configured to notify the entity that the actual contents 214 of the data file 108 does not comply (i.e., is different) than the registered information 206 and/or that the data file is being prohibited from being communicated to the external recipient 258. In other embodiments, the alert 264 may be configured to notify predetermined entities 262 that the actual contents 214 of the data file 108 exhibited differences between the registered information 206; however, the data file 108 was allowed to be communicated to the external recipient 258.

Referring to FIG. 4 a flow diagram is presented of a method 300 for providing verification of data files prior to data channel submission, in accordance with embodiments of the present invention. At Event 310, information associated with a data file is registered in a data file registration repository. The information includes, at a minimum, contents of the data file, such as quantity of line items, quantity of secure (e.g., non-public) data elements and the like. The registration typically occurs proximate in time (e.g., concurrently) with creation of the data file or shortly thereafter. In specific embodiments of the method, the registration is an automated process in which, in response to creating the data file, the metadata in the files' header is captured or otherwise received and serves as the basis for the registered information. Additional manual entries to the captured metadata may also be possible. In other embodiments of the method, registration is a manual process that includes user entry of the registered information.

At Event 320, in response to receiving a data file prior to submitting the data file to a chosen data channel, the data file repository registration repository is accessed to identify the registered information associated with the received data file. At Event 330, the payload of the data file is interrogated to determine the actual contents of the data file (e.g., actual quantity of line items, secure data elements and the like). In addition, the actual contents are compared to the registered information to determine difference(s) between the actual content and registered information.

At optional Event 340, a type of difference (line items, secure data elements, checksum or the like) between the actual content and the registered information and/or degree of difference (e.g., how many different line items or secure data elements) is determined between the actual content and the registered information. At Event 350, based on the determined type and/or degree of differences between the actual content and the registered information, one or more actions are performed. The actions may include, but are not limited to, prohibiting communication of the data file to the external recipient, requesting approval/waiver to communicate the data file, communicating the data file and sending alerts to predetermined internal entities and the like.

Thus, systems, apparatus, methods, and computer program products described above provide for verification of the contents of a data file prior to external recipient communication. Specifically, the invention provides for a data file registration repository that registers information associated with data files. In specific embodiments, data registration occurs automatically be capturing the file header metadata. Prior to communicating the file to an external recipient (i.e., prior to placing the data file in the data channel), the payload of the data file is interrogated to determine actual content and the actual content is compared to the registered information to insure that the data being communicated is the same as what the data file is purported to contain (i.e., matches the registered information). Other verifications, such as date type authorization, recipient authorization and the like may also occur in conjunction with the content verification. If the verification(s) is successful, the data is authorized to be placed in the data channel for communication to the external recipient, otherwise, if the verification is unsuccessful predetermined actions are performed, which may include prohibiting the data file from being communicated.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for verifying data files prior to communicating the data file, via a data channel, to an external recipient, the system comprising:
a computing platform including a memory and at least one processor in communication with the memory;
a data file registration repository stored in the memory, executable by the processor and configured to register, proximate in time to when the data file is created, information associated with the data file, wherein the registered information includes, at least, contents of the data file, wherein the contents of the data file include a line item quantity and a secured data element quantity; and
a data file interrogation and verification module stored in the memory, executable by the processor that is configured to receive the data file prior to data channel submission, access the data file registration repository to identify the registered information associated with the data file, interrogate a payload of the data file to determine difference between actual contents of the data file and the registered information by:
determining actual line item quantity and actual secured data element quantity; and
comparing the actual line item quantity and the actual secured data element quantity to the registered line item quantity and the registered secured data element quantity to determine a difference between either one of the actual line item quantity and the registered line item quantity or the actual secured data element quantity and the registered secured data element quantity.

2. The system of claim 1, wherein the data interrogation and verification module is further configured to determine a type of the difference and based on the type of the difference perform one of (1) prohibit the data file from being communicated to the external recipient, (2) request approval for the data file to be communicated to the external recipient or (3) communicate the data file to the external recipient and alert predetermined internal entities.

3. The system of claim 1, wherein the data file registration repository is further configured to automatically register the information associated with the data file based on receipt, upon creation of the data file, file header metadata that includes the information to be registered.

4. The system of claim 3, wherein the data registration repository is further configured to receive the file header metadata that includes the information to be registered, wherein the information includes one or more of filename, file size, file type, checksum, identity of file creator, identity of one or more file revisers, dates of one or more revisions to the data file, quantity of line items, and quantity of secure data elements.

5. The system of claim 1, wherein the data file registration repository is further configured to register the information associated with the data file, wherein the registered information includes a first checksum resulting from creation of the data file.

6. The system of claim 5, wherein the data file interrogation and verification module is further configured to create a second checksum of the received data file and compare the second checksum to the first checksum to determine a difference between the first and second checksums.

7. The system of claim 1, wherein the data file registration repository is further configured to register the information associated with the data file, wherein the registered information includes identity of the external recipient.

8. The system of claim 7, wherein the data file interrogation and verification module is further configured to receive an intended external recipient of the data file, and compare the intended external recipient to the identity of the external recipient in the registered information to determine a difference between the intended external recipient and the identity of the external recipient in the registered information.

9. The system of claim 7, wherein the data file registration repository is further configured to register the information associated with the data file, wherein the registered information includes a security status of the contents of the data file.

10. The system of claim 9, further comprising an external recipient security rating repository, stored in the memory, executable by the processor and configured to store security ratings for a plurality of external recipients, wherein the security ratings define a type of data that each external recipient is authorized to receive and wherein the data file interrogation and verification module is further configured to access the external recipient security rating repository to determine the security rating for the intended external recipient and compare the security rating to the security status of the contents of the data file to determine if the security rating is noncompliant with the security status of the contents of the data file.

11. The system of claim 1, further comprising an alert module stored in the memory, executable by the processor and configured to receive notification from the data file interrogation and verification module that the comparison resulted in a difference between the actual contents and the registered information and generate and initiate communication of an alert, to one or more predetermined internal recipients, that is configured to notify the internal recipients that the data file is prohibited from being communicated to the external recipient.

12. A method for verifying data files prior to communicating the data file, via a data channel, to an external recipient, the method comprising:
registering, in a data file registration repository, proximate in time to when the data file is created, information associated with the data file, wherein the registered information includes, at least, contents of the data file; wherein the contents of the data file include at least a line item quantity and a secured data element quantity;
accessing the data file registration repository to identify the registered information associated with the data file; and
interrogating prior to the data file entering the data channel, by a computing device processor, a payload of the data file to determine difference between actual contents of the data file and the registered information by:
determining actual line item quantity and actual secured data element quantity; and
comparing the actual line item quantity and the actual secured data element quantity to the registered line item quantity and the registered secured data element quantity to determine a difference between either one of the actual line item quantity and the registered line item quantity or the actual secured data element quantity and the registered secured data element quantity.

13. The method of claim 12, further comprising:
determining, by a computing device processor, a type of the difference between the actual contents and the registered information; and
based on the type of the difference, performing one of (1) prohibit the data file from being communicated to the external recipient, (2) request approval for the data file to be communicated to the external recipient or (3) communicate the data file to the external recipient and alert predetermined internal entities.

14. The method of claim 12, wherein registering the information associated with the file further comprises automatically registering the information associated with the data file based on receiving, upon creation of the data file, file header metadata that includes the information to be registered.

15. The method of claim 14, wherein receiving the file header metadata further comprises receiving the file header metadata that includes the information to be registered, wherein the information includes one or more of filename, file size, file type, checksum, identity of file creator, identity of one or more file revisers, dates of one or more revisions to the data file, quantity of line items, and quantity of secure data elements.

16. A computer program product comprising: a non-transitory computer-readable medium comprising:
a first set of codes for causing a computer to register, in a data file registration repository, proximate in time to when a data file is created, information associated with the data file, wherein the registered information includes, at least, contents of the data file, wherein the contents of the data file include at least a line item quantity and a secured data element quantity;
a second set of codes for causing a computer to access the data file registration repository to identify the registered information associated with the data file,
a third set of codes for causing a computer to interrogate, prior to the data file entering a data channel, a payload of the data file to determine difference between actual contents of the data file and the registered information by:
determining actual line item quantity and actual secured data element quantity; and
comparing the actual line item quantity and the actual secured data element quantity to the registered line item quantity and the registered secured data element quantity to determine a difference between either one of the actual line item quantity and the registered line item quantity or the actual secured data element quantity and the registered secured data element quantity.

17. The computer-program product of claim 16, wherein the computer-readable medium further comprises a fourth set of codes configured to cause a computer to determine a type of the difference between the actual contents and the registered information and based on the type of the difference, perform one of (1) prohibit the data file from being communicated to the external recipient, (2) request approval for the data file to be communicated to the external recipient or (3) communicate the data file to the external recipient and alert predetermined internal entities.

18. The computer-program product of claim 16, wherein the computer-readable medium further comprises a fourth set of codes configured to cause a computer to configure the data file registration repository to automatically register the information associated with the data file based on receipt, upon creation of the data file, file header metadata that includes the information to be registered.

19. The computer-program product of claim 18, wherein the computer-readable medium further comprises a fourth set of codes configured to cause a computer to configure the data file registration repository to receive the file header metadata that includes the information to be registered, wherein the information includes one or more of filename, file size, file type, checksum, identity of file creator, identity of one or more file revisers, dates of one or more revisions to the data file, quantity of line items, and quantity of secure data elements.

* * * * *